(12) United States Patent
Irons et al.

(10) Patent No.: US 7,733,522 B2
(45) Date of Patent: Jun. 8, 2010

(54) APPARATUS AND METHOD FOR OPTIMIZED FACSIMILE TRANSMISSION

(75) Inventors: Steve Irons, Phoenix, AZ (US); Mark F. Wright, Mesa, AZ (US); David Guilbault, Scottsdale, AZ (US); Eric Lynn, Phoenix, AZ (US)

(73) Assignee: ImageTag, Inc., Chandler, AZ (US)

( * ) Notice: Subject to any disclaimer, the term of this patent is extended or adjusted under 35 U.S.C. 154(b) by 1221 days.

(21) Appl. No.: 11/243,632

(22) Filed: Oct. 4, 2005

(65) Prior Publication Data

US 2006/0082822 A1    Apr. 20, 2006

Related U.S. Application Data

(63) Continuation-in-part of application No. 09/695,564, filed on Oct. 23, 2000, now Pat. No. 6,952,281, which is a continuation-in-part of application No. 09/001,228, filed on Dec. 30, 1997, now Pat. No. 6,192,165.

(51) Int. Cl.
  *G06K 15/00* (2006.01)
  *G06F 3/12* (2006.01)
(52) U.S. Cl. .................. 358/1.9; 358/1.2; 358/1.15; 358/1.16
(58) Field of Classification Search .......... 358/1.16, 358/1.15, 3.28, 539, 426.02, 1.1, 1.2, 1.9, 358/1.13, 1.14, 1.18, 3.27, 400, 401, 402, 358/404, 447, 504; 382/112, 274; 379/100.01; 399/382; 707/1, 2, 3, 10, 104.1
See application file for complete search history.

(56) References Cited

U.S. PATENT DOCUMENTS 6,075,617 A * 6/2000 Fischer et al. .............. 358/1.16

* cited by examiner

*Primary Examiner*—Dov Popovici
*Assistant Examiner*—Thomas J Lett
(74) *Attorney, Agent, or Firm*—Mark F. Wright; Wright Law Group, PLLC

(57) ABSTRACT

The present invention is configured to provide optimization of printed output transmitted by a facsimile machine. By generating and comparing a baseline quality score with a companion quality score, optimization decisions can enhance the quality of facsimile transmissions. Optimization is also enhanced by recognizing the type of facsimile machine used and the optimal configuration settings for the facsimile. The settings for multiple facsimile machines are stored in a database, along with optimal settings for each facsimile machine. To further enhance the results of a facsimile transmission, a database of printers may also be consulted. By utilizing the best possible output from a printer, combined with the optimal settings for a fax machine, the optimal results for can be obtained. Additionally, the use of bar-coded identification for facsimile transmission provides a method of automating the optimization, thereby increasing efficiency by reporting the results of the optimization.

19 Claims, 6 Drawing Sheets

600

610

SelfTest Number: 800000591

Device: Fax
Model: Lanier
Make: LD035
Notes: Expense Report

620

Scan Line Threshold: 20
Spot Filter: 2
Orientation: 5
Quality: 10
In Depth: 0
Max Length: 30
Symbologies: I2OF5,3OF9

630 eCover Sheet

Barcode Found
Number: 001001001
Barcode Length: 9
Check Digit: 9
Symbology: I2of5
Scan Lines Read: 92

Settings Used to Meet Threshold
Spot Filter: 2
Orientation: 5
Quality: 10
In Depth: 0

Size of Barcode Found
Height in Pixels: 220
Width in Pixels: 1020
Skew in Degrees: 0.00288239491647662

Location on Page
Left Edge: 320
Top Edge: 470
Orientation: 0

640

Page 2

Barcode Found
Number: ER00015462
Barcode Length: 10
Check Digit: 14
Symbology: 3of9
Scan Lines Read: 92

Settings Used to Meet Threshold
Spot Filter: 2
Orientation: 2
Quality: 0
In Depth: 3

Size of Barcode Found
Height in Pixels: 260
Width in Pixels: 1230
Skew in Degrees: 0.000567388114415591

Location on Page
Left Edge: 160
Top Edge: 200
Orientation: 0

FIG. 6

APPARATUS AND METHOD FOR OPTIMIZED FACSIMILE TRANSMISSION

RELATED APPLICATIONS

This application is a continuation in part of U.S. patent application Ser. No. 09/695,564, filed on Oct. 23, 2000 now U.S. Pat. No. 6,952,281, which application is a continuation in part of U.S. patent application Ser. No. 09/001,228, filed Dec. 30, 1997, now issued as U.S. Pat. No. 6,192,165.

BACKGROUND OF THE INVENTION

1. Field of the Invention

The present invention relates generally to the field of data communication and more particularly to the use of optimization methodologies to enhance the results of facsimile transmission.

2. Background Art

In today's fast-paced business environment, a major portions of many workers' responsibilities include the receipt and processing of information. Data, in the form of letters memos, reports, charts, graphs, etc., arrives in many forms in many different locations. Much of this information is presently transmitted, received, and processed using electronic data transmission technologies. For example, email, instant messaging, digital voice communication, etc. are becoming increasingly popular methods of transmitting information.

While significant quantities of data and information are readily available in a digital format, paper remains a viable method for communicating information in the modern world. Despite the rapid growth of email and instant messaging as communication tools, facsimile transmission remains a very popular solution for rapid transmission of data from one place to another. Facsimile machines remain a staple of most business offices and many workers still rely on facsimile transmission, even when other communication methodologies are available.

Facsimile transmissions enjoy many advantages over other forms of information transmission. For example, no expensive computer system is required for sending or receiving a facsimile transmission. Given that facsimile machines use standard phone lines for communicating, the installation and support of a facsimile machine is a fairly simple task that can be completed very quickly. Additionally, most office workers are very familiar with the operation of a facsimile machine and need little training or supervision to accomplish the task.

A standard facsimile transmission is accomplished by placing a document into a facsimile machine and, using the facsimile machine, scanning the image to create an electronic data file. The electronic data file is then transmitted over standard phone lines to the receiving facsimile machine where the data file is interpreted and printed out onto paper by the receiving facsimile machine. The process is fairly straightforward and can be accomplished quickly and efficiently by many readily available facsimile machines.

Given the widespread proliferation and acceptance of the facsimile machine, it is not surprising to learn that facsimile transmission is still one of the most widely used methods of data transmission found in the world today. However, even though facsimile transmission remains very popular, there are several factors that must be addressed when adopting facsimile transmission for certain applications. For example, most facsimile machines have a wide variety of settings that allow for the configuration of the machine for different purposes. Settings such as "fine," "superfine," etc. can affect the quality of the As shown by the discussion herein, without additional improvements in the systems and methods utilized in locating and processing information for users, search results provided by standard search engines will continue to be sub-optimal, at least for certain classes of users and certain types of searches.

SUMMARY OF THE INVENTION

The present invention comprises a hardware/software combination that is configured to provide for the optimization of the printed output transmitted by a facsimile machine. By generating and comparing a baseline cover sheet quality score with a companion document quality score, optimization decisions can be made to enhance the quality of facsimile transmissions. Optimization is also enhanced by recognizing the type of facsimile machine being used and providing the optimal configuration settings for the facsimile machine. In the most preferred embodiments of the present invention, the possible settings for multiple facsimile machines are stored in a database, along with the optimal settings for each of the facsimile machines. To further enhance the results of a facsimile transmission, a database of printers may also be consulted. By utilizing the best possible output from a printer, combined with the optimal settings for a fax machine, the optimal results for a facsimile transmission can be obtained. Additionally, the use of bar-coded identification for facsimile transmission provides a method of automating the optimization process, thereby increasing efficiency by reporting the results of the optimization process.

BRIEF DESCRIPTION OF THE DRAWINGS

The preferred embodiments of the present invention will hereinafter be described in conjunction with the appended drawings wherein like designations denote like elements and:

FIG. 6 is a sample facsimile transmission quality report in accordance with a preferred embodiment of the present invention.

DETAILED DESCRIPTION

The present invention comprises a hardware/software combination that is configured to optimize the printed output transmitted by a given facsimile machine. Optimization is accomplished by recognizing the type of facsimile machine being used and providing the optimal configuration settings for the facsimile machine. In the most preferred embodiments of the present invention, the possible settings for multiple facsimile machines are stored in a database, along with the optimal settings for each of the facsimile machines. To further enhance the results of a facsimile transmission, a database of printers may also be consulted. By utilizing the best possible output from a printer, combined with the optimal settings for a fax machine, the optimal results for a facsimile transmission can be obtained. Additionally, the use of bar-coded identification for facsimile transmission provides a method of automating the optimization process, thereby increasing efficiency by reporting the results of the optimization process.

Figure 1:
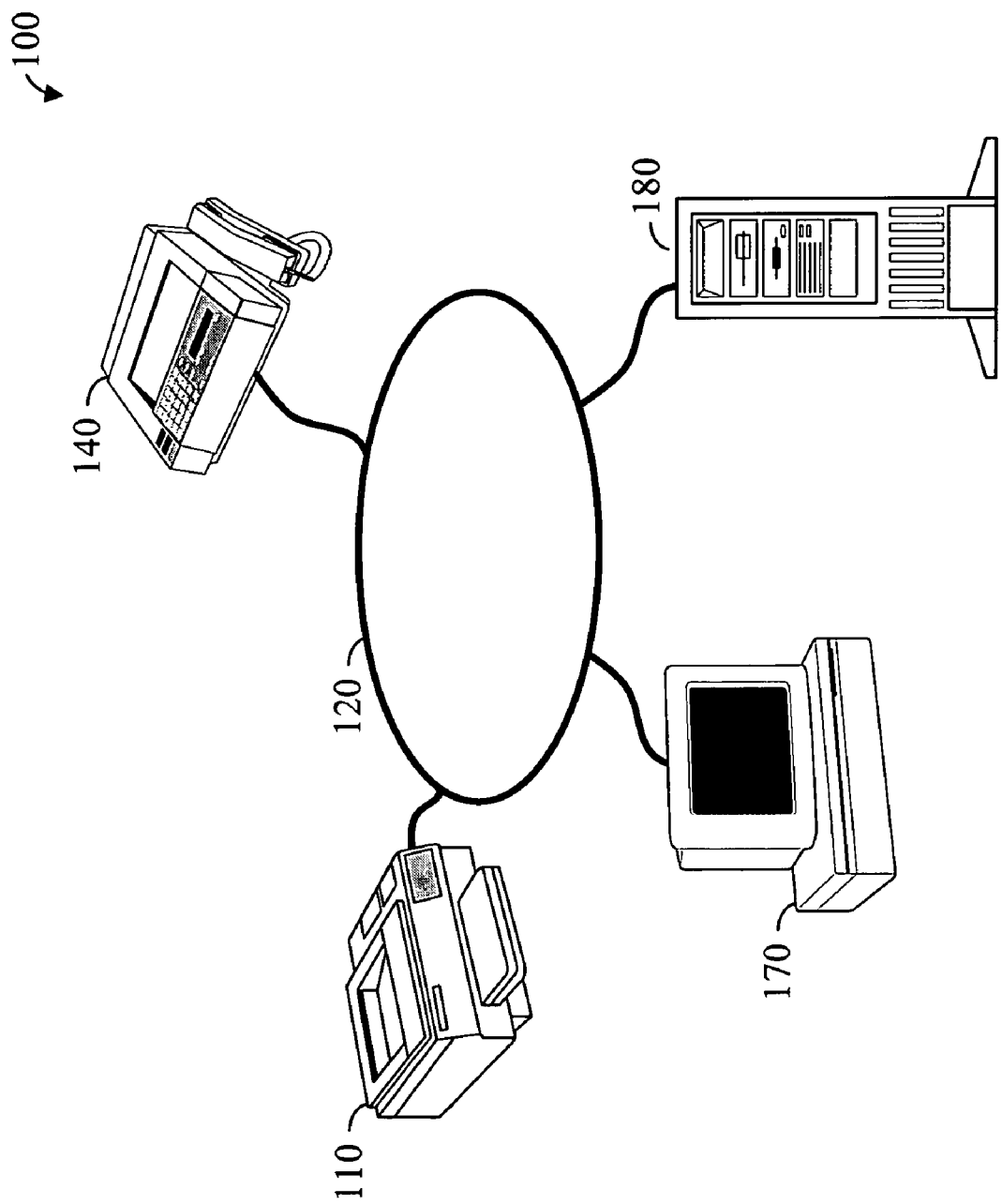
FIG. 1 is a block diagram of a system for optimizing facsimile transmissions in accordance with a preferred exemplary embodiment of the present invention.

Referring now to FIG. 1, a block diagram of a computer-based system 100 for providing customized search results in accordance with a preferred embodiment of the present invention typically comprises: a computer 170; a server 180; a printer 110; and a facsimile (fax) machine 140. Taken together, computer-based system 100 provides a way for individuals, business entities and the like to quickly and efficiently optimize facsimile transmissions as described herein in conjunction with the various preferred embodiments of the present invention.

Printer 110 and fax machine 140 are standard peripheral devices that may be used for transmitting or outputting paper-based documents, notes, search results, reports, etc. in conjunction with the transmission of information processed by computer-based system 100. Printer 110 and fax machine 140 may be directly connected to network 120 or indirectly connected via computer 170 and/or server 180. Finally, it should be noted that printer 110 and fax machine 140 are merely representative of the many types of peripherals that may be utilized in conjunction with computer-based system 100. It is anticipated that other similar peripheral devices will be deployed in the various preferred embodiment of the present invention and no such device is excluded by its omission in FIG. 1. Additionally, those skilled in the art will recognize that a fax machine 140 may be physically incorporated as a fax card into either or both of computer 170 and/or server 180.

Network 120 is any suitable computer communication link or communication mechanism, including a hardwired connection, an internal or external bus, a connection for telephone access via a modem or high-speed T1 line, radio, infrared or other wireless communications, private or proprietary local area networks (LANs) and wide area networks (WANs), as well as standard computer network communications over the Internet or an internal network (e.g. "intranet") via a wired or wireless connection, or any other suitable connection between computers and computer components known to those skilled in the art, whether currently known or developed in the future. It should be noted that portions of network 120 may suitably include a dial-up phone connection, broadcast cable transmission line, Digital Subscriber Line (DSL), ISDN line, or similar public utility-like access link.

In the most preferred embodiments of the present invention, at least a portion of network 120 comprises a standard wired or wireless Internet connection between the various components of computer-based system 100. Network 120 provides for communication between the various components of computer-based system 100 and allows for relevant information to be transmitted from device to device. In this fashion, a user of computer-based system 100 can quickly and easily gain access to the relevant data and information as described in conjunction with the various preferred embodiments of the present invention. Regardless of physical nature and topology, network 120 serves to logically link the physical components of computer-based system 100 together, regardless of their physical proximity. This is especially important because in most preferred embodiments of the present invention, server 180 and computer system 170 will be geographically remote and separated from each other.

Computer 170 may be any type of computer known to those skilled in the art that is capable of being configured for use with computer-based system 100 as described herein. This includes laptop computers, desktop computers, tablet computers, pen-based computers and the like. Computer 170 is most preferably a commercially available computer such as a Linux-based computer, IBM compatible computers, or Macintosh computers. However, those skilled in the art will appreciate that the methods and apparatus of the present invention apply equally to any computer or computer system, regardless of whether the computer is a traditional "mainframe" computer, a complicated multi-user computing apparatus or a single user device such as a personal computer or workstation.

Additionally, handheld and palmtop devices are also specifically included within the description of devices that may be deployed as computer 170. It should be noted that no specific operating system or hardware platform is excluded and it is anticipated that many different hardware and software platforms may be configured to be deployed as computer 170. Various hardware components and software components (not shown this FIG.) known to those skilled in the art may be used in conjunction with computer 170.

Server 180 represents a relatively powerful computer that is configured to store and retrieve data that is made available to computer 170 via network 120. Various hardware components (not shown this FIG.) such as external monitors, keyboards, mice, tablets, hard disk drives, recordable CD-ROM/DVD drives, jukeboxes, fax servers, magnetic tapes, and other devices known to those skilled in the art may be used in conjunction with server 180. Server 180 may also be configured with various additional software components (not shown this FIG.) such as database servers, web servers, firewalls, security software, and the like. While only a single server 180 is shown connected to network 120 in FIG. 1, the most preferred embodiments of the present invention contemplate and embrace multiple servers 180, with provisions being made for redundancy, load balancing, etc. The various servers may vary in size, complexity and capability, but will all generally be capable of communicating with computer 170 via network 120.

In general, server 180 represents a network accessible data server that is configured to interact with the users of computer 170 via network 120. A typical transaction may be represented by a request to store information or access information directly stored on server 180 or stored on some other computer or computer system that is logically connected to server 180. The request to store or retrieve information may include requests involving any type of digitized data, whether voice, text, graphics, etc. and the information may be stored in any format known to those skilled in the art. In the most preferred embodiments of the present invention, the communication between a computer 170 and server 180 will be related to the optimization of a facsimile transmission.

It should be noted that while FIG. 1 shows only a single computer 170 connected to network 120, it is anticipated that the most preferred embodiments of the present invention will comprise dozens or hundreds or even thousands of similarly configured computer computers 170 so as to provide simultaneous access for many different users. In the most preferred embodiments of the present invention, multiple computers 170 will all be configured to communicate with one or more data servers 180 and with each other via network 120. By utilizing the various components of computer-based system 100, a request to optimize a facsimile transmission can be made by the operator of computer 170, with the request being received and processed by server 180.

Figure 2:
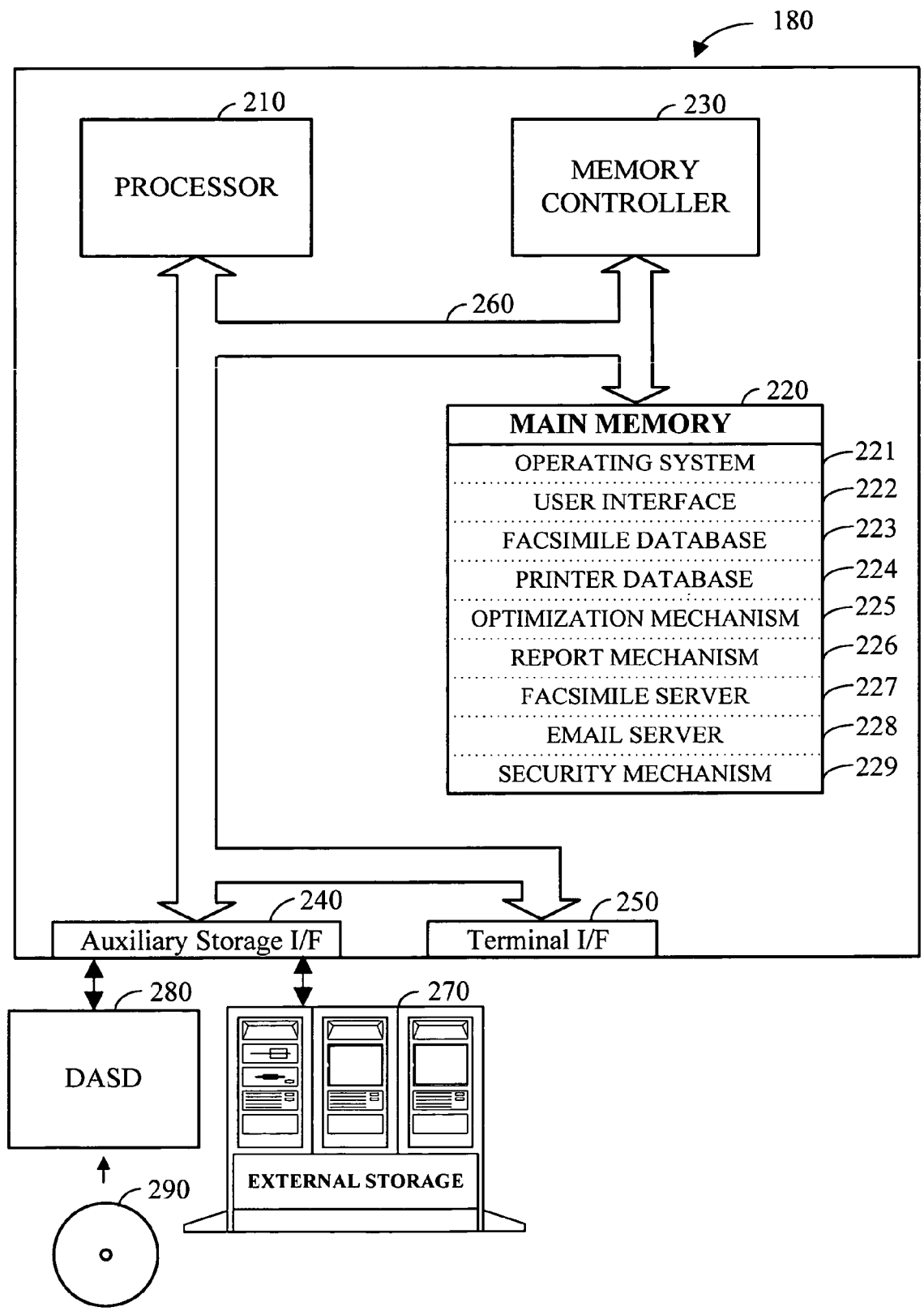
FIG. 2 is a block diagram of the facsimile optimization server of FIG. 1 configured to provide facsimile optimization in accordance with a preferred exemplary embodiment of the present invention.

Referring now to FIG. 2, a block diagram representing server 180 of FIG. 1 for implementation in conjunction with the computer-based system of FIG. 1 in accordance with a preferred embodiment of the present invention is depicted. Server 180 may also be configured with various additional hardware and/or software components (not shown this FIG.) such as database servers, firewalls, comprehensive security software, and the like. The use of these various optional hardware and software components is well known to those skilled in the art. Given the relative advances in the state-of-the-art computer systems available today, it is anticipated that functions of server 180 may be provided by many standard, readily available data servers.

Server 180 suitably comprises at least one Central Processing Unit (CPU) or processor 210, a main memory 220, a memory controller 230, an auxiliary storage interface 240, and a terminal interface 250, all of which are interconnected via a system bus 260. Note that various modifications, additions, or deletions may be made to server 180 illustrated in FIG. 2 within the scope of the present invention such as the addition of cache memory or other peripheral devices. FIG. 2 is not intended to be an exhaustive example, but is presented to simply illustrate some of the salient features of server 180.

Processor 210 performs computation and control functions of server 180, and comprises a suitable central processing unit (CPU). Processor 210 may comprise a single integrated circuit, such as a microprocessor, or may comprise any suitable number of integrated circuit devices and/or circuit boards working in cooperation to accomplish the functions of a processor. Processor 210 suitably executes one or more software programs contained within main memory 220.

Auxiliary storage interface 240 allows server 180 to store and retrieve information from auxiliary storage devices, such as external storage mechanism 270, magnetic disk drives (e.g., hard disks or floppy diskettes) or optical storage devices (e.g., CD-ROM). One such suitable storage device is a direct access storage device (DASD) 280. As shown in FIG. 2, DASD 280 may be a drive subsystem that may read programs and/or data from a CD or DVD 290. It is important to note that while the present invention has been (and will continue to be) described in the context of a fully functional computer system, those skilled in the art will appreciate that the various software mechanisms of the present invention are capable of being distributed in conjunction with signal bearing media as one or more program products in a variety of forms, and that the various preferred embodiments of the present invention applies equally regardless of the particular type or location of signal bearing media used to actually carry out the distribution. Examples of signal bearing media include: recordable type media such as floppy disks and CD ROMS (e.g., disk 290), and transmission type media such as digital and analog communication links, including wireless communication links.

Memory controller 230, through use of an auxiliary processor (not shown) separate from processor 210, is responsible for moving requested information from main memory 220 and/or through auxiliary storage interface 240 to processor 210. While for the purposes of explanation, memory controller 230 is shown as a separate entity; those skilled in the art understand that, in practice, portions of the function provided by memory controller 230 may actually reside in the circuitry associated with processor 210, main memory 220, and/or auxiliary storage interface 240.

Terminal interface 250 allows users, system administrators and computer programmers to communicate with server 180, normally through separate workstations or through stand-alone computer systems such as computer system 170 of FIG. 1. Although server 180 depicted in FIG. 2 contains only a single main processor 210 and a single system bus 260, it should be understood that the present invention applies equally to computer systems having multiple processors and multiple system buses. Similarly, although the system bus 260 of the preferred embodiment is a typical hardwired, multi-drop bus, any connection means that supports bi-directional communication in a computer-related environment could be used.

Main memory 220 most preferably contains an operating system 221, a user interface 222, a facsimile database 223, an optional printer database 224, an optimization mechanism 225, a report mechanism 226, a facsimile server 227, an email server 228, and a security mechanism 229. The term "memory" as used herein refers to any storage location in the virtual memory space of server 180.

It should be understood that main memory 220 may not necessarily contain all parts of all components shown. For example, portions of operating system 221 may be loaded into an instruction cache (not shown) for processor 210 to execute, while other files may well be stored on magnetic or optical disk storage devices (not shown). In addition, although user interface 222, facsimile database 223, optional printer database 224, optimization mechanism 225, report mechanism 226, facsimile server 227, email server 228, and security mechanism 229 are shown to reside in the same memory location as operating system 221, it is to be understood that main memory 220 may consist of multiple disparate memory locations. Typically, facsimile database 223 will comprise data from multiple databases and the contents of facsimile database 223 may change from time to time. Additionally, any and all of the components shown in main memory 220 may be combined in various forms and distributed as a stand-alone program product. Finally, it should be noted that additional components may also be included.

For example, while not required, most preferred embodiments of the present invention will include a security mechanism 229 for verifying and validating user access to the data files stored by server 180. Security mechanism 229 may be incorporated into operating system 221 and/or user interface 222. Once again, depending on the type and quantity of information stored in facsimile database 223, security mechanism 229 may also be configured to provide different levels of security and/or encryption for computer 170 and/or server 180 of FIG. 1.

Additionally, the level and type of security measures applied by security mechanism 229 may be determined by the nature of a given search request and/or response to the search request, including the identity of the requestor. In some preferred embodiments of the present invention, security mechanism 229 may be contained in or implemented in conjunction with certain hardware components (not shown this FIG.) such as hardware-based firewalls, routers, switches, dongles, and the like.

Operating system 221 includes the software that is used to operate and control server 180. In general, processor 210 typically executes operating system 221. Operating system 221 may be a single program or, alternatively, a collection of multiple programs that act in concert to perform the functions of an operating system. Any operating system known to those skilled in the art may be considered for inclusion with the various preferred embodiments of the present invention.

User interface 222 may be any application currently known or later developed for communicating with a client, including various web clients over a network such as the Internet. Examples of suitable user interface 222 include dedicated user interface programs implemented in conjunction with various web servers such as Apache web servers, Linux web servers, and the like. Those skilled in the art will appreciate that custom variations of these standard web servers may also be used in various preferred embodiments of the present invention. Additionally, other vendors have developed or will develop applications and web servers that will be suitable for use with user interface 222 in conjunction with the various preferred embodiments of the present invention. The most preferred embodiment of user interface 222 is a web-browser based user interface that is accessed via the Internet using any standard web-browser such as Internet Explorer, Safari, Firefox, etc.

Facsimile database 223 is representative of any suitable database known to those skilled in the art. In the most preferred embodiments of the present invention, facsimile database 223 is a Structured Query Language (SQL) compatible database file capable of storing a wide variety of information. In conjunction with the most preferred embodiments of the present invention, facsimile database 223 is configured to store information about various facsimile machines, including the optimal settings for various facsimile machines to transmit various types of documents. While facsimile database 223 is shown residing in main memory 220, it should be noted that facsimile database 223 may also be physically stored in a location other than main memory 220. For example, facsimile database 223 may be stored on external storage device 270 or DASD 280 and coupled to server 180 via auxiliary storage I/F 240. Indeed, in the most preferred embodiments of the present invention, facsimile database 223 will compose significant portions of the information and content contained or accessible via the Internet. In the most preferred embodiment of the present invention, facsimile database 224 is continually updated with facsimile data.

Optional printer database 224 is also a Structured Query Language (SQL) compatible database file capable of storing a wide variety of information. In conjunction with the most preferred embodiments of the present invention, facsimile database 223 is configured to store information about various printers, including the optimal print settings for printing various types of documents. Optional printer database 224 may be configured manually or programmatically, depending on the specific type of data to be stored. In the most preferred embodiment of the present invention, printer database 224 is continually updated with printer data.

Optimization mechanism 225 is most preferably a software application that provides for the comparison of the quality for one or more documents, typically facsimile transmitted documents. Optimization mechanism 225 is configured to programmatically evaluate the image quality of one or more facsimile-transmitted documents and generate a quality score for each evaluated document. By generating a baseline quality score for a baseline document and then generating a separate quality score for a new document, the level of quality for the new document can be ascertained, at least as compared to the quality score for the baseline document. If the quality score for a given document is not at the desired level, optimization mechanism 225 can adjust the image evaluation characteristics and repeatedly evaluate a given document to determine the image quality, based on the settings necessary to identify the content of the image.

Additionally, optimization mechanism 225 will track the user of each received image so as to report back to the user the level of quality for the transmitted documents. This means that optimization mechanism 225 is configured to communicate with report mechanism 226 to generate various reports, detailing the results of the optimization process and the quality evaluation for various documents transmitted via facsimile transmission.

Report mechanism 226 is provided to allow system 100 of FIG. 1 to create a variety of reports by accessing database 223 via search mechanism 225. These reports will typically include the results of the various searches performed by the user of computer system 170 of FIG. 1. These various reports will be formatted and presented to the user based on the specific type of request made by the user and the type of information to be returned to the user.

Those skilled in the art will recognize that although index mechanism 224, search mechanism 225 and report mechanism 226 are shown as separate entities in FIG. 2, index mechanism 224, search mechanism 225 and report mechanism 226 may be combined into a single software program or application or program product.

Fax server 227 is any fax server known to those skilled in the art and is configured to receive inbound fax messages and to transmit outbound fax messages. Fax server 227 may format and transmit any data processed by computer-based system 100 of FIG. 1 and make it available for use by any other component of computer-based system 100 of FIG. 1. Additionally, fax server 227 may process the data received and send it directly to index mechanism 224 and make the incoming data available for further processing by computer-based system 100, including processing by report mechanism 226.

While not required, the most preferred embodiments of server 180 of FIG. 2 will typically include an e-mail server 228. E-mail server 228 is any e-mail server application capable of being configured and used to send and receive various status messages and updates to server 180 and/or computer 170 of FIG. 1 via e-mail, as may be necessary to enhance the overall process of completing various reporting activities described herein. This includes the generation of automated e-mail messages relating to the quality of facsimile transmissions stored in database 223 and accessed as described in accordance with the various preferred embodiments of the present invention.

Security mechanism 229 is configured to provide a security model for providing customized results for reporting the status of facsimile transmissions, based on the identity and role of the person or entity making the request to view a facsimile transmission and the quality results.

Figure 3:
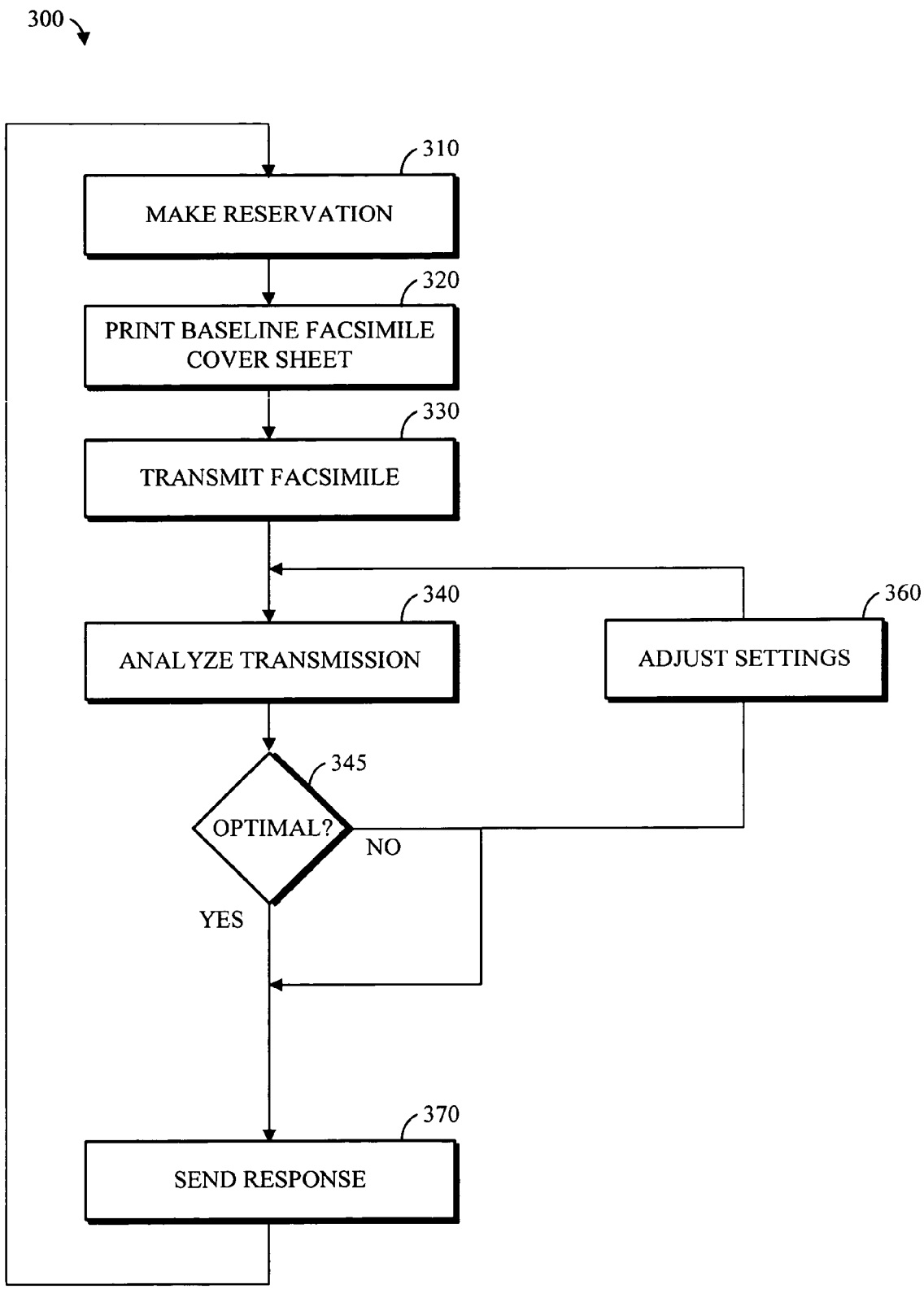
FIG. 3 is a is a flowchart for a method of optimizing facsimile transmissions in accordance with a preferred embodiment of the present invention.

Referring now to FIG. 3, a method 300 for optimizing a facsimile transmission in accordance with a preferred embodiment of the present invention is depicted. As shown in FIG. 3, a user that wishes to optimize a facsimile transmission will begin by logging into an Internet website and creating a document reservation via user interface 222 (step 310). The creation of a reservation is the process of identifying the information relative to both the user, the pending facsimile transmission and, if desired, the type of facsimile machine and printer used in the testing process. Once the information has been supplied by the user, a reservation number for the pending facsimile transmission.

Figure 5:
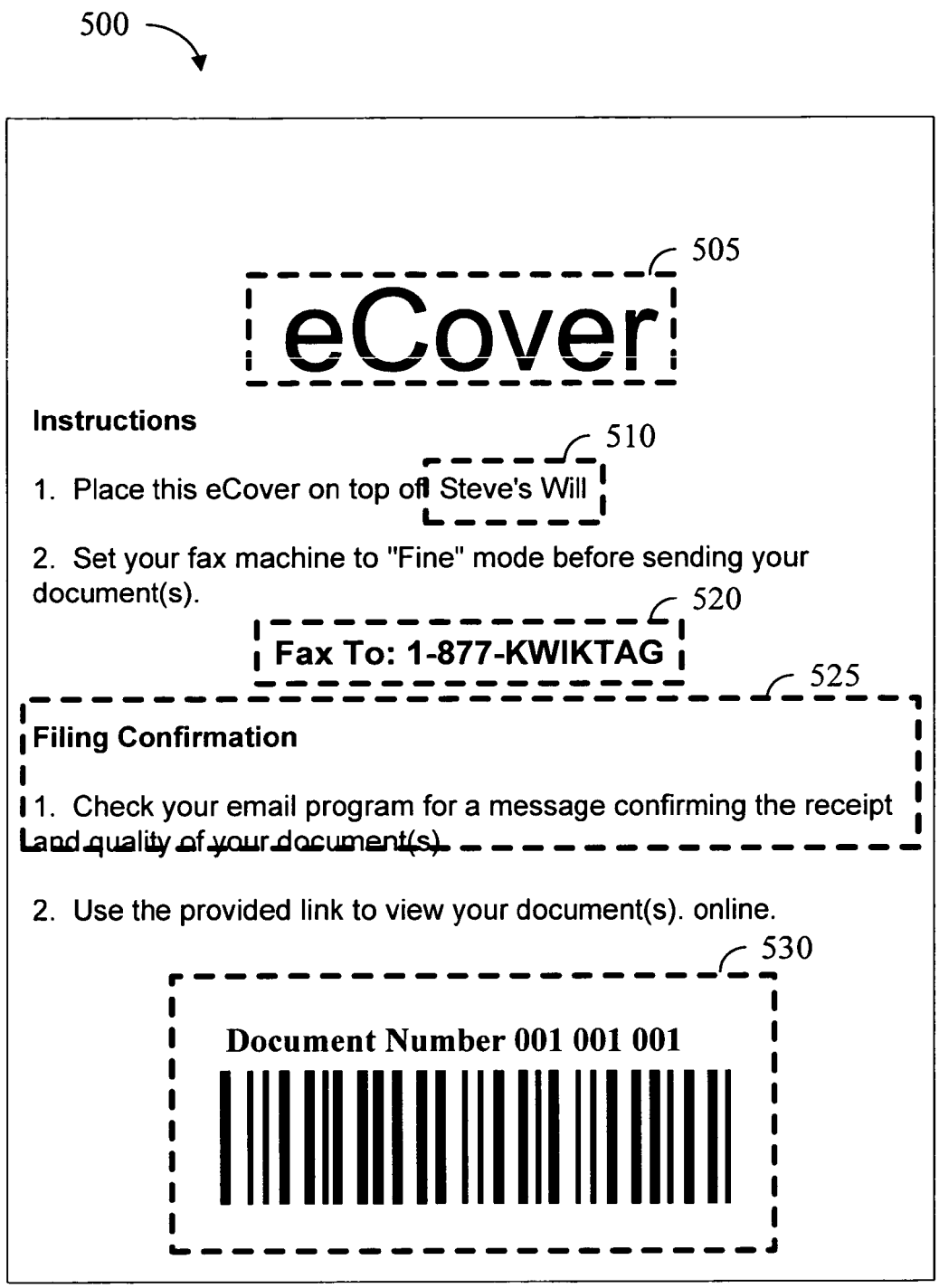
FIG. 5 is a representation of a facsimile cover sheet suitable for optimizing facsimile transmissions in accordance with a preferred embodiment of the present invention.

Next, the user can print a baseline facsimile cover sheet for the pending facsimile transmission (step 320). The baseline facsimile cover sheet typically contains the reservation number for the pending facsimile transmission in a barcode format, using any barcode methodology known to those skilled in the art. Additionally, in the most preferred embodiments of the present invention, the baseline facsimile cover sheet will also contain at least some eye-legible content to identify the user documents to be transmitted in conjunction with the baseline facsimile cover sheet. This will allow the user to properly associate the baseline facsimile cover sheet with the appropriate user document(s). A sample baseline facsimile cover sheet is shown in FIG. 5. Next, the user will place the baseline facsimile cover sheet on top of the paper document to be transmitted via facsimile and send both documents for evaluation (step 330). In the most preferred embodiments of the present invention, the paper document will also contain a barcode identifier. One acceptable method for generating reservation numbers and barcode for cover sheets and documents is set forth in U.S. Pat. No. 6,952,281.

Once received by server 180 of FIG. 1, optimization mechanism 225 will begin the process of analyzing the facsimile transmission (step 340). The process of analyzing the transmission can include many different steps, but generally comprises the step of processing the received images and looking for the identifying barcodes. However, in addition to locating the barcodes, the most preferred embodiments of the present invention will use a process whereby the results of image processing for the baseline facsimile cover sheet are compared to the results of the image processing for the companion document to ascertain and optimize the quality of the document images.

For example, the most preferred embodiments of the present invention will utilize one or more programmatic methodologies for evaluating the image quality of the digital images. These programmatic methodologies include but are not limited to: a spot filter setting; an orientation setting; a quality setting; and an in-depth setting. Each of these settings is discussed in greater detail below.

The spot filter selects a pre-determined spot filter to be applied to the bar code before reading. The size of the spot filter can be adjusted, based on whether or not the barcode is found during the image processing step. Sample settings for the spot filter may be "0" for no spot filter, "1" for using a 1 inch by 1 inch filter, and "2" for using a 2 inch by 2 inch spot filter.

The orientation setting specifies the general orientation for bar codes in the digital image. It should be noted that "horizontal" orientation means that the vertical bars of the bar code are perpendicular to the x-axis of the image. Orientation may be specified as "0" to look for barcodes with a horizontal orientation only, "1" to search for barcodes with a vertical orientation only, and "2" to search for barcodes with a horizontal or vertical orientation. Additional orientation settings may be used to further quantify the barcode orientation for image processing purposes. For example, "3" may indicate to search for horizontal barcodes with significant "skew" while an orientation setting of "4" may be used to indicate to search for vertical barcodes with significant "skew" and an orientation setting of "5" may be used for searching for vertical and horizontal barcodes with significant skew.

The quality setting may be used to condition the bar code reading process to assume different quality in the images. The quality value may range from 1 to 10, with 10 representing the best quality input images. With lower values, the bar code reading function will "try harder" to read the bar code; higher numbers will allow the reading process to give up sooner. Generally, use low numbers for poor quality images, and high numbers for high quality images. Some guidelines for quality values may be a setting of "1" for first generation facsimile transmission, a setting of "3" for a microfilm scan, a setting of "7" for a second generation copy (i.e, a copy of a copy), and a setting of "10" for a first generation or original print.

The in-depth setting can be used as a parameter for processing each page and can be configured to include a combination of any or all of the previous parameters, depending on how much time and processing power is available. For example, a setting of "0" may be specified to ignore the quality setting, a setting of "1" can be used to specify that the image processing should include the orientation setting only, a setting of "2" may be used to indicate that the quality setting only should be used, a setting of "3" may be used to specify that both the orientation setting and the quality setting should be used, etc.

To determine the image quality score for a given document, the baseline settings will be used to perform image processing on the digital image of a paper-based document that has been transmitted via facsimile to server 180 of FIG. 1. If the barcode cannot be found using the baseline settings, then the baseline settings will be programmatically and incrementally adjusted by optimization mechanism 225 until the barcode can be found and identified. By calculating the overall difference between the baseline setting and the final settings, an approximation of the overall image quality of the document can be ascertained.

By including a baseline cover sheet with the target or companion document, it will be possible to determine whether the companion document and the baseline cover sheet are of the same quality, thereby further isolating any quality issues to the facsimile machine used for transmission or to the individual documents being transmitted with the baseline facsimile cover sheet. For example, if the quality score for the baseline cover sheet is high but the quality score for the documents being transmitted with the baseline facsimile cover is low, then the facsimile machine is most likely acceptable for facsimile transmission and the quality of the documents being transmitted with the baseline facsimile cover should be examined. However, if the quality score for the baseline cover sheet and the documents being transmitted with the baseline facsimile cover are low, then the facsimile machine may be unacceptable for use.

Once the image has been evaluated, it can be compared to the pre-determined baseline score to ascertain whether or not the image has met the appropriate optimization threshold (step 345) for barcode recognition. If the image quality score does not meet the pre-determined threshold for barcode recognition, the image processing settings may be adjusted by the optimization mechanism (step 360) and the image analysis process may be repeated (step 340). This process may continue until an appropriate quality score is achieved or until it is no longer desirable to continue to process the image. In either case, eventually, a response will be sent to the user (step 370), detailing the results of the image quality analysis process. By reviewing and responding to the image quality analysis process, the user can further enhance or optimize the facsimile transmission process for future transmissions. This may include adjusting printer and/or facsimile machine settings, providing higher quality (i.e., first generation) originals, etc.

Figure 4:
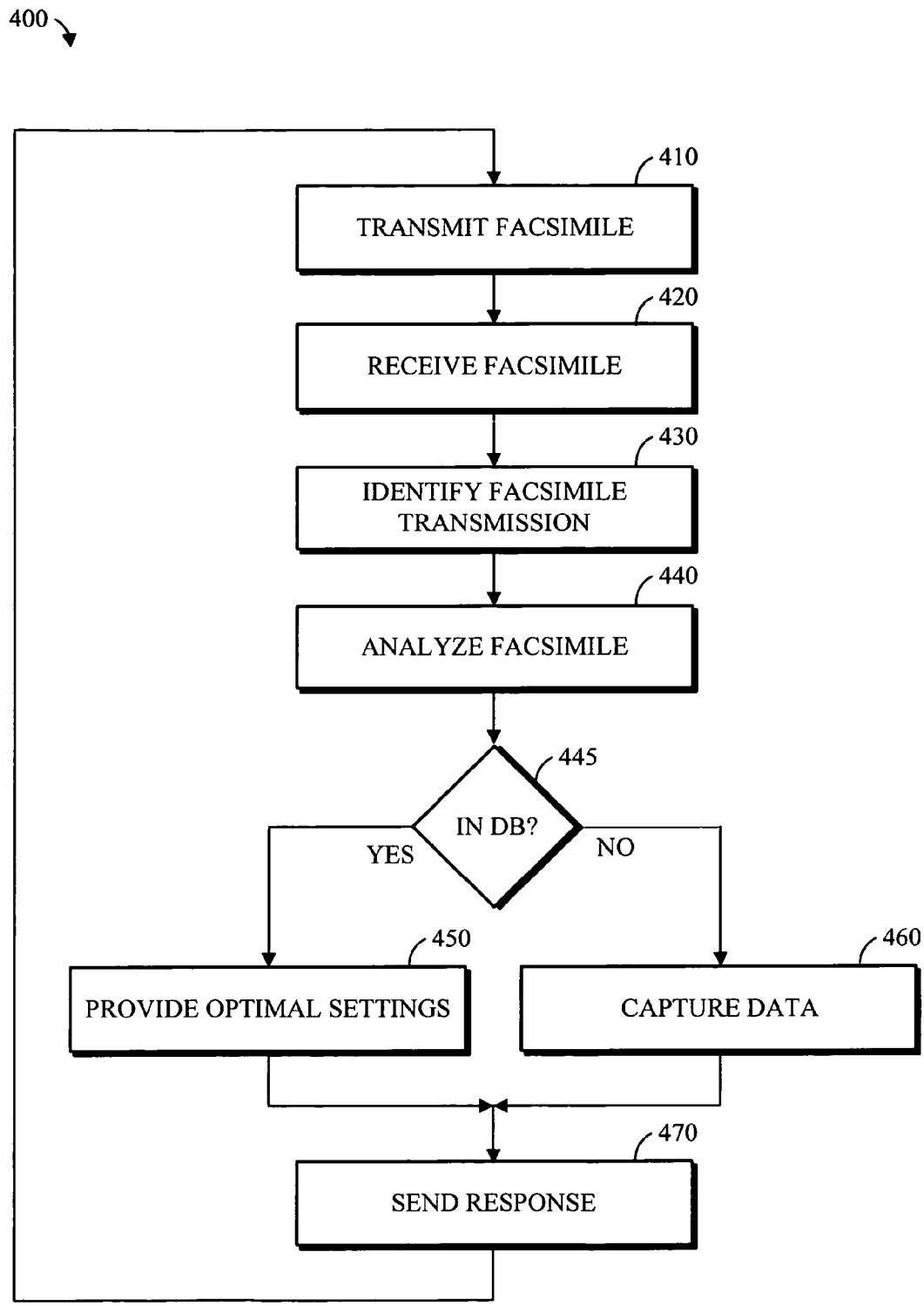
FIG. 4 is a flowchart for a method of further optimizing facsimile transmissions in accordance with a preferred embodiment of the present invention.

Referring now to FIG. 4, a method 400 for further optimizing a facsimile transmission in accordance with a preferred embodiment of the present invention is depicted. As shown in FIG. 4, a document is transmitted via facsimile (step 410), received (step 420), and identified (step 430). The facsimile transmission will most preferably be identified by a baseline facsimile cover sheet, similar to the one described in FIG. 5. It should be noted that the methodologies set forth in FIG. 3 and FIG. 4 are complementary and may be used in tandem for optimization purposes. Specifically, although not enumerated in FIG. 4, the process of creating a reservation is assumed. For at least one preferred embodiment of the present invention, along with describing the document to be transmitted, the user will also specify the type or model of printer and/or facsimile machine being used to transmit the facsimile transmission.

Once the facsimile transmission has been received, the facsimile transmission will be analyzed as discussed in conjunction with FIG. 3 (step 440). Additionally, optimization mechanism 225 will consult facsimile database 223 and/or printer database 224 to determine if the user-specified machines are contained in the appropriate database (step 445). If the user-specified machines are contained in the appropriate database (step 450="YES") then the factory-determined or empirical results-based optimal settings for the user-specified machines can be provided to the user in conjunction with the image quality report and made accessible to the user via email. However, if the user-specified machines are not contained in the appropriate database (step 450="NO"), then the user-specified machine and setting data can be entered into facsimile database 223 and/or printer database 224 (step 460), along with the quality scores generated by the specific combination of machines, thereby adding to the empirical results contained in facsimile database 223 and/or printer database 224. By continually updating the results contained in facsimile database 223 and/or printer database 224, it will be possible to provide the optimal settings for a wide variety of machines. Finally, the results of the image processing operation is transmitted to the user (step 470).

Referring now to FIG. 5, a sample image of a baseline facsimile cover sheet 500 in accordance with a preferred embodiment of the present invention is illustrated. Each baseline facsimile cover sheet 500 will contain at least one dynamic content zone. As shown in FIG. 5, baseline facsimile cover sheet 500 contains both static and dynamic content zones, dynamic content zones, containing information related to the testing process as well as the specific paper-based document to be transmitted via facsimile for testing purposes. A detailed discussion of the generation and use of static and dynamic content zones for facsimile transmission is further described in U.S. Pat. No. 6,952,281.

For purposes of illustration, consider a user who wishes to test the facsimile transmission of an executed will. In this case, as shown in FIG. 5, dynamic content zone 510 contains the title or description of the document to be filed, as entered by the user at the time the user created the reservation. In contrast, static content zone 520 and static content zone 530 contain system-supplied content. In this example, the content of static content zone 520 is a fax phone number which is identified with the user and which can be dynamically altered based on the user profile. Dynamic content zone 530 contains a bar-coded file identifier associated with the document to be filed. By using dynamic content zones 510 and 530, the user is provided with a visual cue regarding which fax cover sheet should be placed on which document and how the document should be transmitted for testing purposes.

Referring now to FIG. 6, a sample facsimile quality report 600 is depicted. Facsimile quality report is generated by report mechanism 226, working in conjunction with optimization mechanism 225. As shown in FIG. 6, various quality measurements can be reported, using one or more information blocks 610, 620, 630, and 640. Those skilled in the art will recognize that the number, placement, and content of information blocks 610, 620, 630, and 640 is largely a matter of design choice and application environment. More or less information may be presented in multiple alternative formats without departing from the spirit and scope of the present invention and the specific representations depicted in FIG. 6 are illustrative only.

In the case of FIG. 6, the identification number of the quality test, along with the identification of the type of facsimile machine used to make the transmission are contained in information block 610. Information block 620 identifies the baseline optimization settings for the baseline quality score, as well as the type of barcode symbologies that may be identified. Information block 630 describes the results of the imaging analysis performed on the first page of the facsimile transmittal. This includes the various image processing settings that were used to locate and identify the barcode printed on the baseline facsimile cover sheet. Additionally, the barcode metrics are presented for review. Information block 640 displays the results of the imaging analysis performed on the second page of the facsimile transmittal. Since the image processing settings for the second page are of a comparably lower quality than the first page, various assumptions and determinations can be made by comparing the various values. In order to enhance the image quality of the second page of the facsimile transmittal, the original document can be printed at a higher resolution, a better facsimile machine may be used for transmission, etc.

In the most preferred embodiments of the present invention, the digital image of both the facsimile transmission and facsimile quality report 600 are stored on-line and an email message with a hyper-text link is emailed back to the user at the user-specified email address. By clicking on the hyper-text link, the user can access the digital image of the facsimile transmission and facsimile quality report 600. Alternatively, the digital image of the facsimile transmission and facsimile quality report 600 can be incorporated directly into an e-mail message that is sent back to the user at the user-specified email address. The user can review both the digital image of the facsimile transmission and facsimile quality report 600, thereby ascertaining whether or not the image quality is acceptable from a visual standpoint as well as a technology overhead standpoint. This is important since almost any image can be interpreted, given enough time and processing power. However, the amount of time and processing power required to process a given image may warrant the associated costs, both in time and money. Accordingly, by using facsimile quality report 600 to evaluate and optimize the settings for a given document or documents, the appropriate balancing point can be achieved.

In summary, the present invention provides an apparatus and method for optimizing facsimile transmissions. By implementing the hardware/software combination herein, the optimal settings for printing and transmitting documents via facsimile can be determined and applied, thereby enhancing the final output or results. Additionally, the use of bar-coded identification for facsimile transmission provides a method of automating the optimization process, thereby increasing efficiency by reporting the results of the optimization process. Lastly, it should be appreciated that the illustrated embodiments are preferred exemplary embodiments only, and are not intended to limit the scope, applicability, or configuration of the present invention in any way. Rather, the foregoing detailed description provides those skilled in the art with a convenient road map for implementing the preferred exemplary embodiments of the present invention. Accordingly, it should be understood that various changes may be made in the function and arrangement of elements described in the various preferred exemplary embodiments without departing from the spirit and scope of the present invention as set forth in the appended claims.

The invention claimed is:

1. An apparatus comprising:
   at least one processor;
   a memory coupled to said at least one processor; and
   an optimization mechanism residing in said memory, said optimization mechanism being configured to iteratively receive a facsimile transmittal, analyze said facsimile transmittal, generate at least one quality score for facsimile transmittal, and provide a set of optimized settings for said facsimile transmittal until said at least one quality score for said facsimile transmittal reaches a pre-determined quality level.

2. The apparatus of claim 1 further comprising:
a network connected to said at least one processor and said at least one memory;
a printer coupled to said network; and
a facsimile machine coupled to said network.

3. The apparatus of claim 1 further comprising:
at least one facsimile database residing in said memory;
at least one printer database residing in said memory;
wherein said optimization mechanism is configured to provide said set of optimized settings for said facsimile transmittal by accessing said at least one facsimile database and said at least one printer database.

4. The apparatus of claim 1 wherein said optimization mechanism is configured to iteratively receive a facsimile transmittal, analyze said facsimile transmittal, generate at first quality score for facsimile transmittal, generate a second quality score for said facsimile transmittal and provide a set of optimized settings for said facsimile transmittal base on a comparison of said first quality score and said second quality score.

5. The apparatus of claim 1 further comprising a report mechanism residing in said memory, said report mechanism being configured to provide at least one report describing said optimized settings for said facsimile transmittal.

6. The apparatus of claim 1 wherein said optimization mechanism is configured to identify said facsimile transmittal based on an earlier-created reservation for said facsimile transmittal, said reservation comprising a digital image of a bar-coded coversheet and a companion document.

7. The apparatus of claim 1 wherein said set of optimized settings for said facsimile transmittal comprises at least one of:
a spot filter setting;
an orientation setting;
a quality setting; and
in-depth setting.

8. The apparatus of claim 1 wherein said set of optimized settings for said facsimile transmittal comprises:
a spot filter setting;
an orientation setting;
a quality setting; and
in-depth setting.

9. The apparatus of claim 1 further comprising a report mechanism residing in said memory, said report mechanism being configured to generate a report configured to provide at least one report describing said optimized settings for said facsimile transmittal, said at least one report being transmitted via email to at least one email address.

10. The apparatus of claim 1 further comprising:
a network coupled to said at least one processor;
a printer coupled to said network;
a facsimile machine coupled to said network;
a user interface residing in said memory;
a report mechanism residing in said memory;
a facsimile server residing in said memory;
an email server residing in said memory;
a security mechanism residing in said memory;
at least one facsimile database residing in said memory; and
at least one printer database residing in said memory; and an optimization mechanism residing in said memory, wherein said optimization mechanism is configured to iteratively receive a facsimile transmittal, analyze said facsimile transmittal, generate at first quality score for facsimile transmittal, generate a second quality score for said facsimile transmittal and provide a set of optimized settings for said facsimile transmittal by accessing said at least one facsimile database and said at least one printer database and by comparing said first quality score and said second quality score.

11. A computer implemented method comprising the steps of:
a) creating a digital image of a baseline facsimile cover sheet, said digital image of said baseline facsimile cover sheet being stored in a memory, said memory being coupled to at least one processor;
b) generating at least one quality score for said digital image of said baseline facsimile cover sheet;
c) providing a set of optimized settings for said digital image of said baseline facsimile cover sheet based on said at least one quality score;
d) repeating steps a-c until said at least one quality score for said digital image of a baseline facsimile cover sheet reaches a pre-determined quality level.

12. The method of claim 11 further comprising the step of generating at least one report describing said optimized settings for said digital image of a baseline facsimile cover sheet, said at least one report being transmitted via email to at least one email address.

13. The method of claim 11 wherein said step of providing a set of optimized settings for said digital image of said baseline facsimile cover sheet based on said at least one quality score comprises the step of accessing at least one of a printer database and a facsimile database.

14. The method of claim 11 wherein said step of providing a set of optimized settings for said digital image of said baseline facsimile cover sheet based on said at least one quality score comprises the step of providing at least one of:
a spot filter setting;
an orientation setting;
a quality setting; and
in-depth setting.

15. The method of claim 11 further comprising the steps of:
generating a quality score for a digital image of a companion document; and
comparing said quality score for said digital image of said companion document to said quality score for said digital image of said baseline facsimile cover sheet.

16. The method of claim 11 wherein said step of providing a set of optimized settings for said digital image of said baseline facsimile cover sheet based on said at least one quality score comprises the steps of:
accessing a printer database to determine an optimal setting for at least one printer; and
accessing a facsimile database to determine an optimal setting for at least one facsimile machine.

17. The method of claim 11 wherein said step of providing a set of optimized settings for said digital image of said baseline facsimile cover sheet based on said at least one quality score comprises the steps of:
accessing a printer database to determine an optimal setting for at least one printer;
accessing a facsimile database to determine an optimal setting for at least one facsimile machine; and
providing said set of optimized settings for said digital image of said baseline facsimile cover sheet to at least one email address.

18. The method of claim 11 wherein said step of providing a set of optimized settings for said digital image of said baseline facsimile cover sheet based on said at least one quality score comprises the steps of providing:
- a spot filter setting;
- an orientation setting;
- a quality setting; and
- in-depth setting.

19. A computer implemented method comprising the steps of:
- using a printer to print a baseline facsimile cover sheet, said baseline facsimile cover sheet displaying at least one bar code;
- placing said baseline facsimile cover sheet on top of a companion document, said companion document displaying said at least one bar code;
- placing said baseline facsimile cover sheet and said companion document into a facsimile machine;
- processing said baseline facsimile cover sheet and said companion document through said facsimile machine, thereby transforming said baseline facsimile cover sheet and said companion document into a digital version of said baseline facsimile cover sheet and said companion document;
- transmitting said digital version of said baseline facsimile cover sheet and said companion document via facsimile transmission to a server;
- storing said digital version of said baseline facsimile cover sheet and said companion document in a computer memory contained within said server;
- using a microprocessor controlled computer to analyze said digital image of said baseline facsimile cover sheet and said companion document;
- assigning a quality score for said digital image of said baseline facsimile cover sheet;
- assigning a quality score for said digital image of said companion sheet; and
- comparing said quality score for said digital image of said baseline facsimile cover sheet and said quality score for said digital image of said companion sheet for optimization purposes.

* * * * *